United States Patent [19]

Maezawa et al.

[11] Patent Number: 5,671,127
[45] Date of Patent: Sep. 23, 1997

[54] DC POWER SUPPLY DEVICE WITH HIGH VOLTAGE AND LARGE POWER HANDLING CAPABILITY

[75] Inventors: Akihiko Maezawa; Takeshi Yoshioka, both of Kanagawa-ken, Japan

[73] Assignee: Ebara Corporation, Tokyo, Japan

[21] Appl. No.: 611,660

[22] Filed: Mar. 6, 1996

[30] Foreign Application Priority Data

Mar. 10, 1995 [JP] Japan ..................... 7-051460

[51] Int. Cl.$^6$ ............... H02M 7/00; H01F 30/12
[52] U.S. Cl. .................... 363/5; 323/361
[58] Field of Search ............... 323/361; 363/5, 363/129; 378/112

[56] References Cited

U.S. PATENT DOCUMENTS

| | | | |
|---|---|---|---|
| 3,423,664 | 1/1969 | Dewey | 363/51 |
| 3,585,484 | 6/1971 | Dortort | 363/5 |
| 5,065,303 | 11/1991 | Nguyen et al. | 363/40 |
| 5,317,299 | 5/1994 | Dhyanchand et al. | 323/361 |

OTHER PUBLICATIONS

Electrical Engineering Handbook, published in 1988 by Electrical Engineering Society of Japan.
E.A. Abramyan, "Industrial Electron Acelerators and Application", published by Hemisphere Publishing Corporation, pp. 123, p. 126.

Japanese Ministry of Trade and Industry, Department of Resource and Energy, Public Affair Division "A Guideline of Harmonic Suppressing Method for High Voltage or Ultra–high Voltage Power Receiving Station" pub. Sep. 1994, pp. 2, pp. 4 and 6 (of Annex).

Primary Examiner—Stuart N. Hecker
Attorney, Agent, or Firm—Armstrong, Westerman, Hattori, McLeland & Naughton

[57] ABSTRACT

Three-phase alternating-current electric energy supplied from a primary power supply is supplied to first and second six-phase transformer-coupled rectifying circuits which are connected in cascade to each other. The first six-phase transformer-coupled rectifying circuit comprises three primary windings connected in delta, and the second six-phase transformer-coupled rectifying circuit comprises three primary windings connected in star, for producing respective output voltages which are $\pi/6$ out of phase with each other. The first and second six-phase transformer-coupled rectifying circuits, which are connected in cascade to each other, jointly provide a twelve-phase rectifying circuit which produces a reduced harmonic or ripple current in its output energy as compared with a six-phase transformer-coupled rectifying circuit. The two six-phase transformer-coupled rectifying circuits share a voltage applied to the power supply device, and hence may have lower requirements for withstanding a breakdown voltage.

2 Claims, 3 Drawing Sheets

DC POWER SUPPLY DEVICE WITH HIGH VOLTAGE AND LARGE POWER HANDLING CAPABILITY

BACKGROUND OF THE INVENTION

1. Field of the Invention

The present invention relates to a direct-current power supply device for generating direct-current electric energy for high voltage, large output power requirements, and more particularly to such a high-voltage, large-output direct-current power supply device for use as a power supply for electrostatic electron accelerators used in the field of radiation chemistry.

2. Description of the Prior Art

Electrostatic electron accelerators are generally constructed of an electron gun for producing electrons in vacuum, an acceleration tube for accelerating the produced electrons, and a direct-current (DC) power supply for imparting accelerating energy to the electrons. The DC power supply comprises a DC power supply device for converting alternating-current (AC) electric energy to DC electric energy with a multiphase rectifying circuit and supplying high-voltage, large-output electric energy. An electrostatic electron accelerator for use in setting coated films and inks, for example, employs a DC power supply device which can supply electric energy at a voltage ranging from 150 to 300 KV and a current ranging from 1 to 2 A. Another electrostatic electron accelerator for use in processing exhaust gases has a DC power supply device capable of supplying electric energy at a voltage ranging from 500 to 1000 KV and a current ranging from 1 to 2 A.

Such high-voltage, large-output DC power supply devices generally use a transformer-coupled rectifying circuit for converting commercially available AC electric energy having a frequency of 50 or 60 Hz directly into DC electric energy without a high-frequency converter such as a Cockcroft circuit or the like. The reason for using such a transformer-coupled rectifying circuit is to increase the power conversion efficiency which is the reciprocal of a ratio of the DC electric energy to the commercially available AC electric energy.

FIG. 1 of the accompanying drawings shows a conventional DC power supply device which comprises a six-phase transformer-coupled rectifying circuit. As shown in FIG. 1, the conventional DC power supply device includes a primary power supply 1 comprising a three-phase AC power supply such as a commercially available AC power supply, three primary windings 2U, 2V, 2W of U-, V-, and W-phases, respectively, connected in star to the primary power supply 1, three sets of secondary windings 3U1–3U6, 3V1–3V6, 3W1–3W6 transformer-coupled to the primary windings 2U, 2V, 2W, respectively, and three sets of bridge rectifying circuits 4U1–4U6, 4V1–4V6, 4W1–4W6 connected respectively to the secondary windings 3U1–3U6, 3V1–3V6, 3W1–3W6. The primary windings 2U, 2V, 2W serve as primary circuits, and the secondary windings 3U1 3U6, 3V1–3V6, 3W1–3W6 and the bridge rectifying circuits 4U1–4U6, 4V1–4V6, 4W1–4W6 make up a plurality of secondary circuits.

The secondary circuits are divided into six groups in which three secondary circuits are associated with the respective U-, V-, and W-phases and are connected in cascade. The six groups of secondary circuits are connected in cascade. The primary circuits and the secondary circuits thus cascaded jointly make up an insulated core-type transformer.

The six-phase transformer-coupled rectifying circuit can produce a six-phase rectified electric energy output with one group of three secondary circuits connected in cascade. In the arrangement shown in FIG. 1, the six groups of secondary circuits are cascaded in order to generate a higher output DC voltage. Depending on the desired voltage level to be outputted, however, the DC power supply device may comprise a plurality of groups of secondary circuits, ranging from several to several tens of groups of secondary circuits, which are connected in cascade.

As shown in FIG. 2 of the accompanying drawings, the conventional DC power supply device shown in FIG. 1 produces an output DC voltage which contains fundamental and harmonic components from the commercially available AC power supply in addition to the DC component. If harmonic or ripple currents due to such harmonic components flow from the DC power supply device to a device connected thereto, then the connected device may be unduly heated and possibly thermally damaged, depending on the magnitude of the harmonic currents.

Thermal damage due to harmonic or ripple currents is caused by not only high-voltage, large-output DC power supply devices, but also AC power supply devices with thyristor power control. Specifically, recent years find more AC-powered electric devices controlled by thyristors, which introduce harmonic or ripple currents into AC electric energy supplied to the controlled electric devices. Under the circumstances, the Agency of Natural Resources and Energy in Japan has issued guidelines for controlling harmonics in DC- or AC-powered electric devices.

One possible way of reducing a harmonic current contained in the DC output energy from the DC power supply device is to increase the number of phases of the DC power supply device. Specifically, a harmonic current can be reduced by a DC power supply device comprising two six-phase transformer-coupled rectifying circuits, each of the circuit arrangement shown in FIG. 1, connected parallel to each other into a twelve-phase transformer-coupled rectifying circuit. Each of the two six-phase transformer-coupled rectifying circuits connected parallel to each other has half a current capacity as the current capacity of the six-phase transformer-coupled rectifying circuit shown in FIG. 1. However, since the two six-phase transformer-coupled rectifying circuits are connected parallel to each other, each of them is required to withstand the same breakdown voltage as that of the six-phase transformer-coupled rectifying circuit shown in FIG. 1. Accordingly, it is necessary for the DC power supply device having such a twelve-phase transformer-coupled rectifying circuit to have two six-phase transformer-coupled rectifying circuits each capable of withstanding a high voltage ranging from 150 to 1000 KV.

Another problem of the twelve-phase DC power supply device is that while the current capacity of each of the six-phase transformer-coupled rectifying circuits is reduced to half, the size of each of the components of the six-phase transformer-coupled rectifying circuits remains substantially unchanged regardless of the reduction in the current rating. The twelve-phase DC power supply device is also disadvantageous in that the insulation required by the two six-phase transformer-coupled rectifying circuits each capable of withstanding a high voltage ranging from 150 to 1000 KV makes the twelve-phase DC power supply device almost twice as large as the six-phase transformer-coupled rectifying circuit shown in FIG. 1. The disadvantage resulting from using the two six-phase transformer-coupled rectifying circuits with the high breakdown voltage withstanding capability far outweighs the advantage provided by using the two six-phase transformer-coupled rectifying circuits with the reduced current capacity.

SUMMARY OF THE INVENTION

It is therefore an object of the present invention to provide a high-voltage, large-output DC power supply device which is of a relatively small size and capable of reducing harmonic currents in its DC output energy.

To accomplish the above object, there is provided in accordance with the present invention a direct-current power supply device comprising a primary power supply for supplying three-phase alternating-current electric energy, and a twelve-phase rectifying circuit connected to the primary power supply for converting the three-phase alternating-current electric energy supplied from the primary power supply into direct-current electric energy, the twelve-phase rectifying circuit comprising first and second six-phase transformer-coupled rectifying circuits connected in cascade to each other for producing respective output voltages which are $\pi/6$ out of phase with each other. The direct-current power supply device of the above arrangement produces a reduced harmonic or ripple current in its output energy, and may be constructed in a compact size.

The first six-phase transformer-coupled rectifying circuit may comprise three primary windings connected in delta, and the second six-phase transformer-coupled rectifying circuit may comprise three primary windings connected in star. The first six-phase transformer-coupled rectifying circuit may comprise three sets of three secondary windings which are transformer-coupled to the three primary windings, respectively, thereof, and the second six-phase transformer-coupled rectifying circuit may comprise three sets of three secondary windings which are transformer-coupled to the three primary windings, respectively, thereof, the three secondary windings in each of the sets being connected in open delta.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

Figure 3:
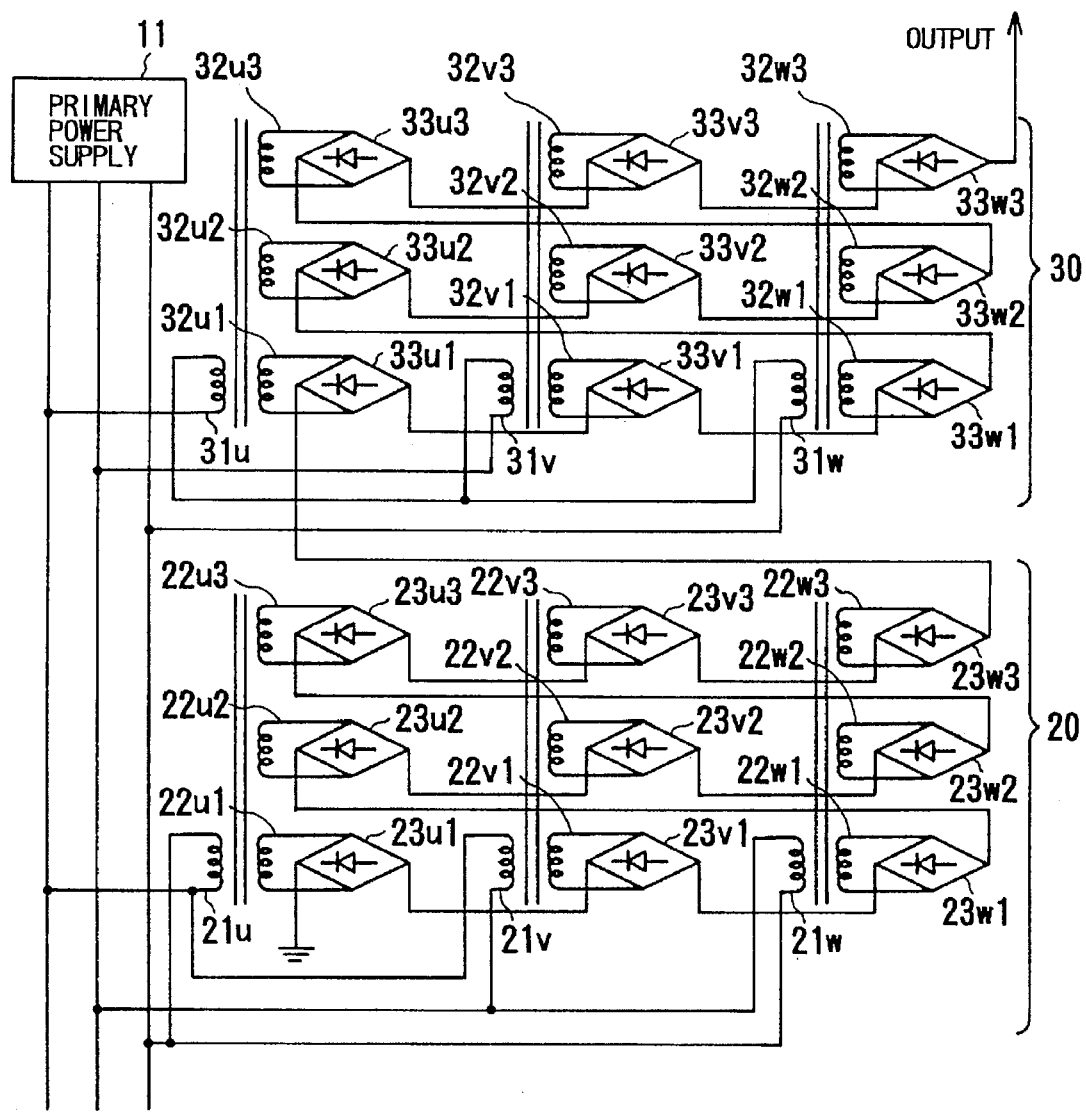
FIG. 3 is a circuit diagram of a DC power supply device according to the present invention.

As shown in FIG. 3, a high-voltage, large-output DC power supply device according to the present invention comprises a primary power supply 11 comprising a three-phase AC power supply 11 such as a commercially available AC power supply, a first six-phase transformer-coupled rectifying circuit 20, and a second six-phase transformer-coupled rectifying circuit 30.

The first six-phase transformer-coupled rectifying circuit 20 comprises three primary windings 21U, 21V, 21W of U-, V-, and W-phases, respectively, connected in delta to the primary power supply 11, three sets of secondary windings 22U1–22U3, 22V1–22V3, 22W1–22W3 transformer-coupled to the primary windings 21U, 21V, 21W, respectively, and three sets of bridge rectifying circuits 23U1–23U3, 23V1–23V3, 23W1–23W3 connected respectively to the secondary windings 22U1–22U3, 22V1–22V3, 22W1–22W3. The three secondary windings in each phase are connected in open delta. The bridge rectifying circuits 23U1, 23V1, 23W1, 23U2, 23V2, 23W2, 23U3, 23V3, 23W3 have respective pairs of output terminals connected in cascade in the order named. One of the output terminals of the bridge rectifying circuit 23U1 and one of the output terminals of the bridge rectifying circuit 23W3 serve as a pair of output terminals of the first six-phase transformer-coupled rectifying circuit 20.

The second six-phase transformer-coupled rectifying circuit 30 comprises three primary windings 31U, 31V, 31W of U-, V-, and W-phases, respectively, connected in star to the primary power supply 11, three sets of secondary windings 32U1–32U3, 32V1–32V3, 32W1–32W3 transformer-coupled to the primary windings 31U, 31V, 31W, respectively, and three sets of bridge rectifying circuits 33U1–33U3, 33V1–33V3, 33W1–33W3 connected respectively to the secondary windings 32U1–32U3, 32V1–32V3, 32W1–32W3. The three secondary windings in each phase are connected in open delta. The bridge rectifying circuits 33U1, 33V1, 33W1, 33U2, 33V2, 33W2, 33U3, 33V3, 33W3 have respective pairs of output terminals connected in cascade in the order named. One of the output terminals of the bridge rectifying circuit 33U1 and one of the output terminals of the bridge rectifying circuit 33W3 serve as a pair of output terminals of the second six-phase transformer-coupled rectifying circuit 30.

The first and second six-phase transformer-coupled rectifying circuits 20, 30 are connected in cascade to each other. Therefore, one of the output terminals of the first six-phase transformer-coupled rectifying circuit 20 and one of the output terminals of the second six-phase transformer-coupled rectifying circuit 30 serve as a pair of output terminals of the DC power supply device.

In the embodiment shown in FIG. 3, one of the output terminals of the bridge rectifying circuit 33W3 of the second six-phase transformer-coupled rectifying circuit 30 is used as a positive terminal of the DC power supply device, whereas one of the output terminals of the bridge rectifying circuit 23U1 of the first six-phase transformer-coupled rectifying circuit 20 is used as a ground terminal of the DC power supply device. However, the output terminal of the bridge rectifying circuit 33W3 may be used as a ground terminal of the DC power supply device, and the output terminal of the bridge rectifying circuit 23U1 may be used as a negative terminal of the DC power Supply device. Furthermore, the first and second six-phase transformer-coupled rectifying circuits 20, 30 may be connected in reverse cascade, and one of the output terminals of the bridge rectifying circuit 23W3 of the first six phase transformer-coupled rectifying circuit 20 and one of the output terminals of the bridge rectifying circuit 33U1 of the second rectifying circuit 30 may serve as a pair of output terminals of the DC power supply device. The DC power supply device shown in FIG. 3 may be changed or modified in other ways.

Figure 1:
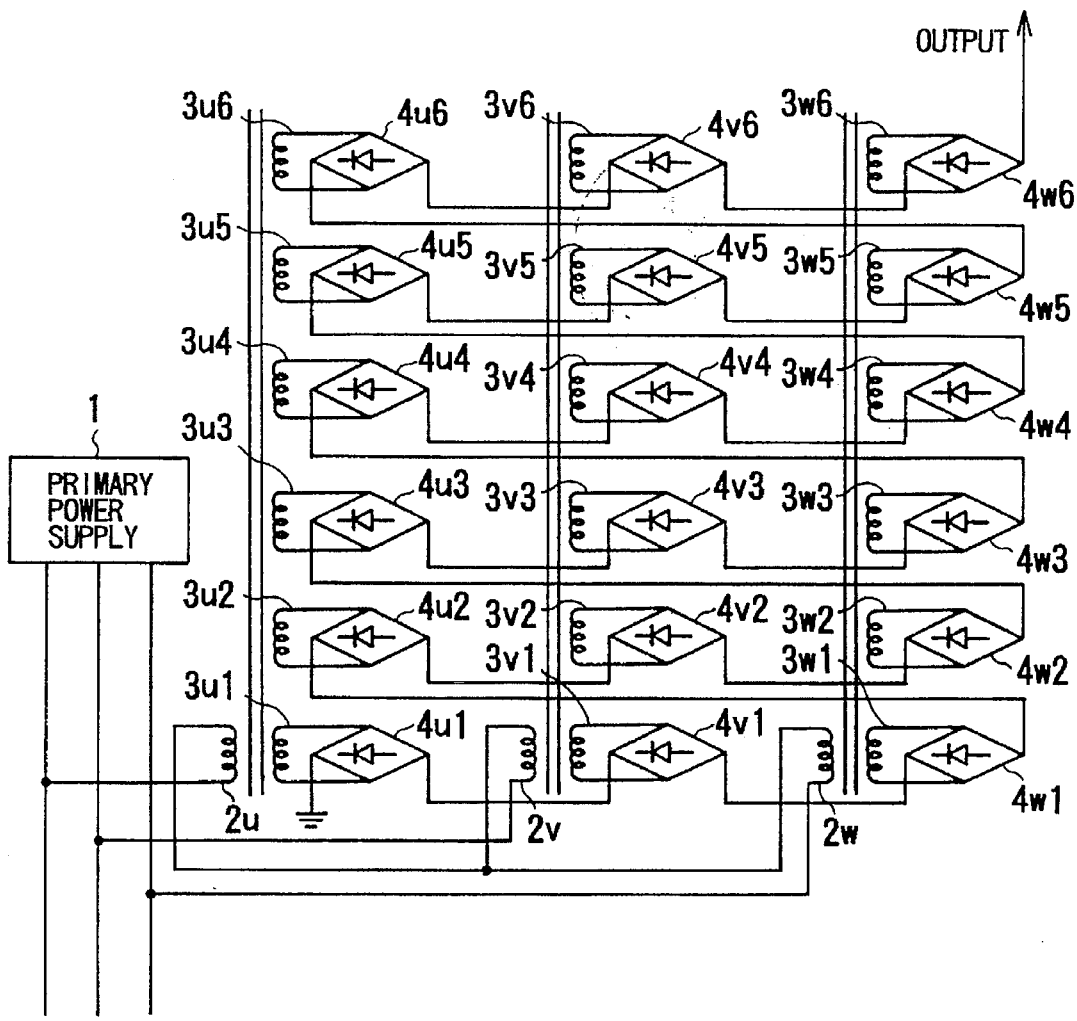
FIG. 1 is a circuit diagram of a conventional DC power supply device.
Figure 2:
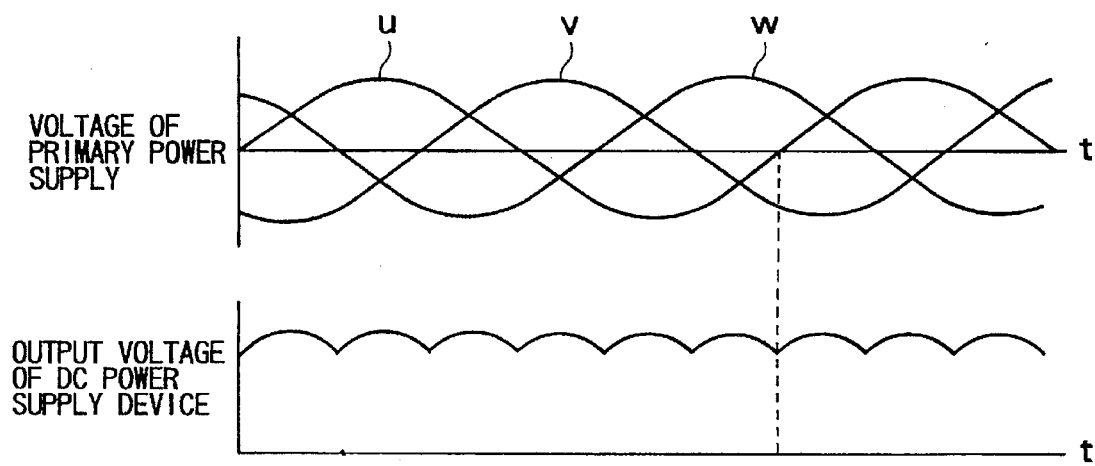
FIG. 2 is a diagram showing the waveforms of voltages of a primary power supply and a DC output voltage of the conventional DC power supply device shown in FIG. 1.
Figure 4:
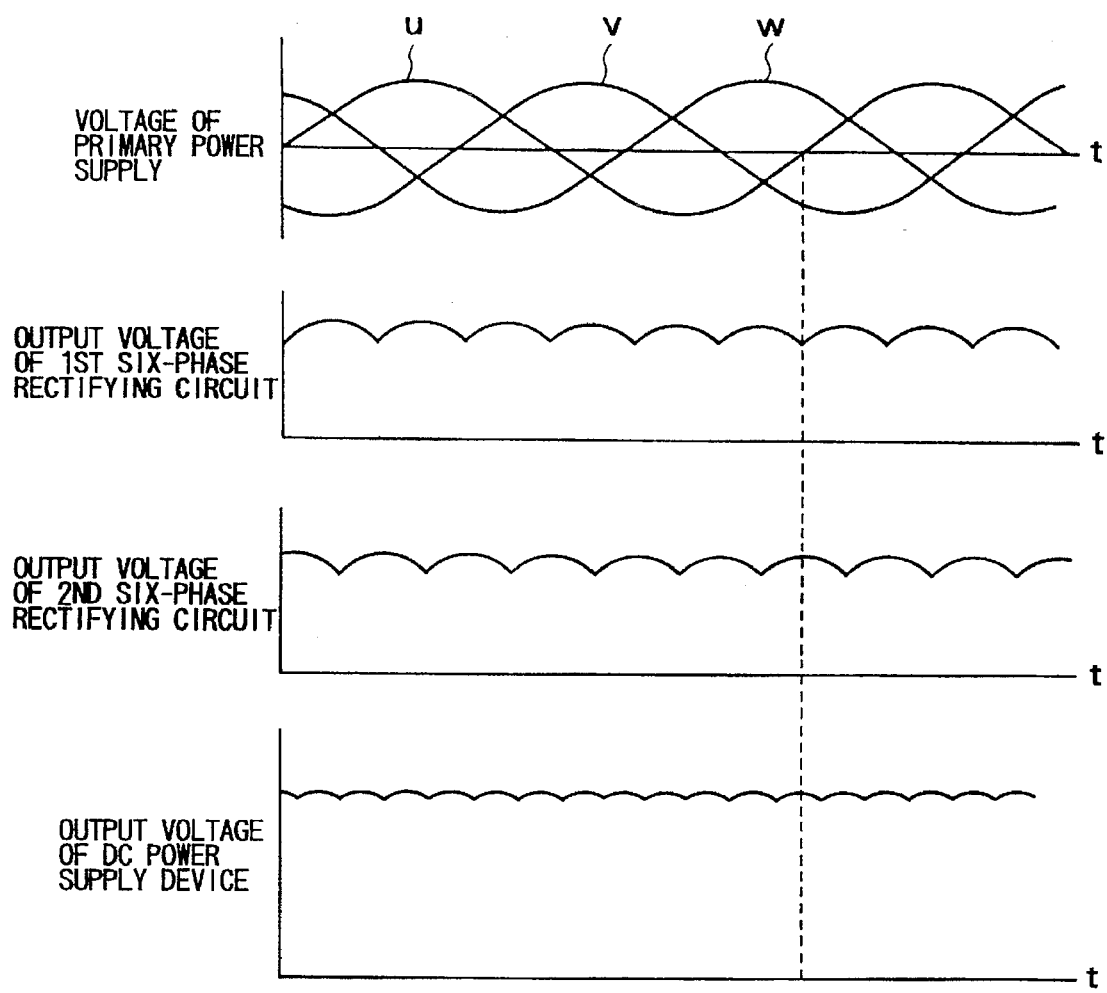
FIG. 4 is a diagram showing the waveforms of voltages of a primary power supply and DC output voltages of the DC power supply device shown in FIG. 3.

In the DC power supply device shown in FIG. 3, since the primary windings 21U, 21V, 21W of the first six-phase transformer-coupled rectifying circuit 20 are delta-connected and the primary windings 31U, 31V, 31W of the second six-phase transformer-coupled rectifying circuit 30 are star-connected, the output voltages produced by the respective first and second six-phase transformer-coupled rectifying circuits 20, 30 are $\pi/6$ out of phase with each other. Therefore, as shown in FIG. 4, the first and second six-phase transformer-coupled rectifying circuits 20, 30 which are cascaded produce a twelve-phase output voltage. The DC power supply device shown in FIG. 3 thus comprises a twelve-phase rectifying circuit for producing DC output energy which contains a reduced harmonic or ripple current as compared with the conventional DC power supply device shown in FIG. 1.

The DC power supply device shown in FIG. 3 as a whole comprises six cascaded groups of secondary windings in which three secondary circuits are associated with the respective U-, V-, and W-phases. As a consequence, the DC power supply device can produce a DC output voltage which is of the same level as with the DC power supply device shown in FIG. 1.

In as much as the first and second six-phase transformer-coupled rectifying circuits 20, 30 are connected in cascade to each other, either one of the first and second six-phase transformer-coupled rectifying circuits 20, 30 may be arranged to withstand a required breakdown voltage, or the first and second six-phase transformer-coupled rectifying circuits 20, 30 may be arranged to withstand respective halves or shares of a required breakdown voltage. Therefore, the overall breakdown voltage withstanding capability, and hence the insulation required, of the DC power supply device shown in FIG. 3 may be smaller than that of the DC power supply device shown in FIG. 1. As a result, the DC power supply device shown in FIG. 3 may be relatively small in size.

In illustrated embodiment, the primary windings of the first and second six-phase transformer-coupled rectifying circuits 20, 30 are connected in delta and star, respectively, for shifting their respective output voltages $\pi/6$ out of phase with each other. However, the primary windings of both the first and second six-phase transformer-coupled rectifying circuits 20, 30 may be connected in delta or star, and either of the first and second six-phase transformer-coupled rectifying circuits 20, 30 may have a phase shifting circuit. Each of the first and second six-phase transformer-coupled rectifying circuits 20, 30 is shown as comprising three groups of secondary windings in which three secondary circuits are associated with the respective U-, V-, and W-phases. However, each of the first and second six-phase transformer-coupled rectifying circuits 20, 30 may comprise as many cascaded groups of secondary windings in which three secondary circuits are associated with the respective U-, V-, and W-phases, as required by the level of a desired DC output voltage.

Although a certain preferred embodiment of the present invention have been shown and described in detail, it should be understood that various changes and modifications may be made therein without departing from the scope of the appended claims.

What is claimed is:

1. A direct-current power supply device, comprising:
    a primary power supply for supplying three-phase alternating-current electric energy;
    a first six-phase transformer-coupled rectifying circuit having three primary windings connected in delta;
    a second six-phase transformer-coupled rectifying circuit having three primary windings connected in star;
    each of said six-phase transformer-coupled rectifying circuits having at least a set of three secondary windings which are transformer-coupled to said three primary windings respectively, said three secondary windings in each set being connected in open delta; and
    said first and second six-phase transformer-coupled rectifying circuits connected in cascade to each other for producing respective output voltages which are $\pi/6$ out of phase with each other for converting the three-phase alternating-current electric energy supplied from said primary power supply into twelve-phase rectified direct-current electric energy.

2. A direct-current power supply device according to claim 1, wherein each of said six-phase transformer-coupled rectifying circuits has three sets of three secondary windings, and rectified outputs of said three sets of secondary windings are connected in cascade.

* * * * *